May 27, 1952  J. F. YOUNG  2,598,481

CENTRIFUGALLY OPERATED MOTOR SPEED GOVERNOR

Filed Dec. 24, 1949

Inventor:
James F. Young,
by *Sheridan W. Bepp*
His Attorney.

Patented May 27, 1952

2,598,481

UNITED STATES PATENT OFFICE 2,598,481

CENTRIFUGALLY OPERATED MOTOR SPEED GOVERNOR

James F. Young, Bridgeport, Conn., assignor to General Electric Company, a corporation of New York Application December 24, 1949, Serial No. 135,016

2 Claims. (Cl. 264—17)

My invention relates to governors for motors, more particularly to speed or acceleration governors in the form of centrifugally operated switches. It is concerned with improvements in structures, such as disclosed and claimed in the application of Alastair D. Robertson for U. S. Letters Patent filed February 23, 1949, Serial No. 77,746, now Patent No. 2,557,765, which is assigned to the same assignee as the present invention. My invention may also be applied to governors of the strictly speed-responsive type as distinguished from governors which may be both speed and acceleration responsive, as shown in the aforesaid Robertson application. I will show and describe my invention as applied to a speed governor for a food mixer, although it is obvious that the invention may have other applications or uses.

One object of my invention is to reduce the bearing and friction forces in a governor of the character involved. This will improve the life of operation of the governor, as well as make it more sensitive to the speeds which are to be controlled. Another object of my invention is to increase the simplicity of assembly, and minimize difficulties in making parts of the governor. As a result of the present design, but a small space will be required for the governor, and devices using my governor may, therefore, be made less cumbersome than formerly.

The principal objects of the invention are produced by improvements in the parts of the governor which will become apparent later in the specification. Other objects and the details of that which I believe to be novel and my invention will be clear from the following description and claims taken with the accompanying drawing in which is illustrated an example of a motor speed governor embodying the present invention and incorporating my improvements.

Figure 1:
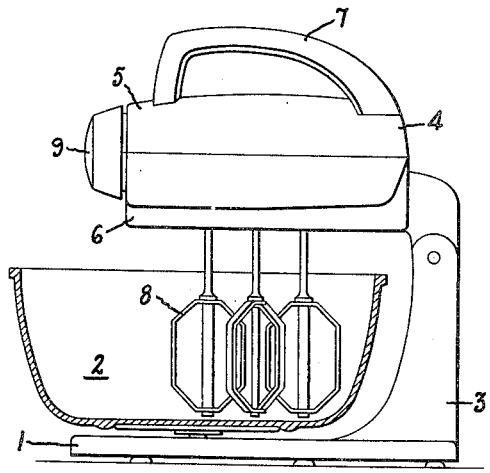
Figure 2:
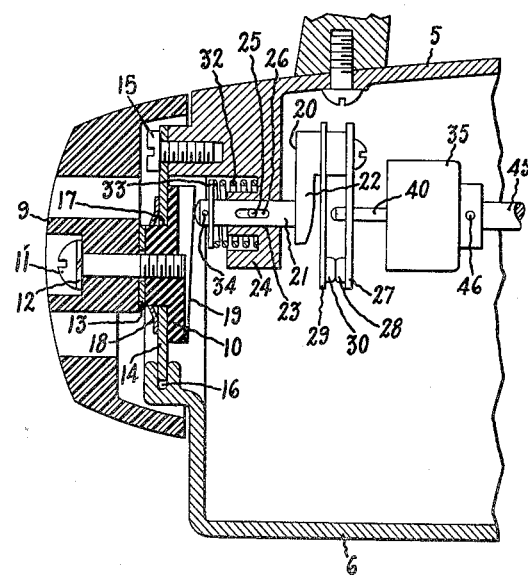
Figure 3:
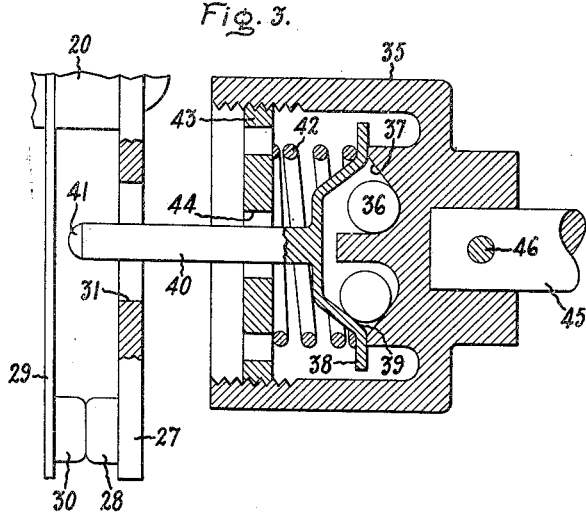
Figure 4:
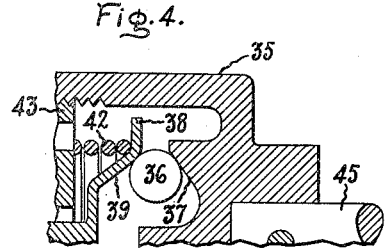

In the drawing, Fig. 1 is a side view, partly in section, of a food mixer to which the governor of my invention may be applied; Fig. 2 is a side vertical section, on a greatly enlarged scale, of the control knob and related governor parts of the mixer of Fig. 1; Fig. 3 is a sectional view, on a still larger scale, of the governor parts of Fig. 2 as they might appear in stationary position; and Fig. 4 is a fragmentary sectional view similar to Fig. 3 but showing some of the governor parts in operating position.

In the exemplary mixer of the drawing, I have shown the usual base 1 which carries a mixing bowl 2 and has an upright 3 to which the mixer motor housing 4 may be suitably secured. I have shown the mixer motor housing as constituting an upper part 5 and a lower part 6 which are suitably secured together and which carry the mixer motor, gearing, and electrical parts in a manner which is not shown because it constitutes no part of the present invention. The housing may be provided with the usual handle 7 and one or more beaters 8 which are driven in conventional fashion from the motor and gearing mentioned above.

Rotatably mounted on one end of the motor housing is a control knob 9, whose angular setting will determine the speed at which the motor operates and, consequently, the speed at which the beaters are rotated. A control cam 10 is secured to the knob to rotate with it. For this purpose, I have shown a machine screw 11 passing through the knob and threaded into the cam, the parts being securely held together against relative rotation when the screw is tightened, by means such as washers 12 and 13.

The control knob and cam assembly is rotatably held on the motor housing as by means of the end piece 14 for the housing, shown as secured by a machine screw 15 in the upper part of the housing and a groove 16 in the lower part of the housing. The shaft of the cam passes through a hole 17 in the housing end piece, and the back face of the cam bears against the inside of this end piece, being held in place thereagainst as by the bearing spring 18 which engages between the shaft of the cam and the outer face of the housing end piece. The inner face of the cam is provided with a spirally beveled cam surface 19 for a purpose to be later described.

In governors of the general character to which my invention relates, there is a rotating element driven by or from the motor whose speed is to be controlled. A normally closed governor switch is in the circuit which powers the motor, and this switch is opened in response to centrifugal force when the rotating element reaches a set speed. This cuts off power to the motor and the rotating element slows down until the centrifugal force abates sufficiently to again allow closing of the switch. When the switch is again closed, the motor starts again and the motor circuit is periodically opened and closed in the manner above described, effectively governing the average speed at which the motor operates and, therefore, the average speed at which the mixer beaters or other mechanism is rotated. This general principle of speed control by periodical circuit interruption is widely used, especially in the art of electrically driven food mixers.

However, unlike many arrangements in governors of this character, my invention uses no brushes, commutators or collector rings, which might be necessary if the governor switch itself were part of the rotating element. In my arrangement, the switch itself does not rotate. Furthermore, my particular arrangement, unlike some others, relieves the governor switch contact arm from all forces excepting those needed for closing the contacts. Other means, within the governor itself, are provided for returning the parts to normal position upon the abatement of the centrifugal operating force. Adjustment of speed settings is made without changing the forces on the switch arm.

As shown in the drawings, the governor switch is supported on an adjustable member 20 of general L-shape, having a horizontal leg 21 and a vertical leg 22. The horizontal leg passes slidably through a bearing opening 23 in an extension 24 of the upper part of the motor housing. To allow limited horizontal movement of the switch supporting member but to prevent turning of this member in the hole 23, I have shown a key pin 25 which extends across the bearing opening and through a slot 26 in the horizontal leg of the switch support member.

The vertical leg 22 of the switch supporting member carries a rigid switch contact arm 27 with a contact 28 at one end, and also a spring contact arm 29 with a cooperating contact 30 at its end. The two contacts are normally biased toward closed position because of the spring nature and setting of the contact arm 29.

Both switch arms are insulated from the switch supporting member and from each other in any suitable fashion and are provided with flexible terminal connections to the control circuit of the motor in a manner readily understood without illustration. A simple way is to connect the governor switch in series with an "on" and "off" motor starting switch. When the starting switch is closed and the contacts of the governor switch are closed, the motor circuit will be alive and the motor will be driven. When either the starting switch or the governor switch contacts are open, the motor circuit will be dead.

Through the rigid switch arm 27, I may provide an opening 31 for a purpose to be later described.

The switch supporting member is normally biased to the left, as viewed in the drawing, toward the operating face of the control cam. This may be done by means of a compression spring 32 which surrounds the horizontal leg of the switch support and bears between the extension 24 of the housing and a washer 33 near the end of the horizontal leg. This washer is suitably held in place on the support as by the pin 34. By this construction, control of the position of the switch supporting member, and, therefore, of the switch arms, is assured by proper positioning of the control knob. The spring 32 pushes the end of the horizontal leg 21 of the support 20 against the cam face 19, and the cam position, corresponding to the knob position, determines how far or how near to the governor mechanism the switch arms will be.

The principal governor mechanism is an element which will expand longitudinally in response to a certain centrifugal force, and which has its own self-contained return spring for restoring the element to its original position when the centrifugal force drops below a desired point. I have shown this governor element as including a cup-shaped holder 35 containing governor flyballs 36, which ride freely in an internal dished track or face 37 in the holder. When the holder is rotating, the balls cooperate with this face and with a coresponding face on a longitudinally slidable member 38. This slidable member has a ball retaining portion in the form of a cup or plate 39 which faces the flyballs and the dished face 37 on the holder. This slidable member also has a central, horizontally extending finger 40 which acts as the expanding and contact lifting portion of the governor element.

This finger on the slidable member passes freely through the hole 31 in the rigid contact arm and has a rounded bearing end 41 which will strike the resilient contact arm to open the contacts 28 and 30 in certain positions of the governor element. The opening in the rigid arm may be so dimensioned as to serve as a bearing for the finger in its rotary and longitudinal sliding movements. The finger itself may be made of suitable insulating material, or otherwise be insulated from the switch arms in order to prevent short-circuiting.

In order to fix the amount of force necessary to initiate movement of the governor toward contact opening position, a governor compression spring 42 is used, bearing between the outer face of the plate portion of sliding member 38 and the inner face of an adjustable nut 43 which is threaded into the end of the holder. During manufacture, adjustment of this nut is used to calibrate the pressure exerted by the compression spring at a proper point for desired operation. When it is set as desired, the nut may be cemented or otherwise secured in place against further rotation. A central hole 44 in the nut is provided for free passage of the movable governor finger 40, and this hole may also be dimensioned to serve as a bearing support for the finger.

The whole governor assembly of holder, flyballs, compression spring, nut and longitudinally slidable member, rotates as a unit with the motor driven shaft 45, and may be held on this shaft as by the drive pin 46 passing through the shaft and through the end of the holder. The shaft is, of course, driven by or from the motor which is enclosed in the housing. Suitable thrust and other bearings (not shown) are provided for the shaft 45 so that it does not shift longitudinally and so that it rotates about a given fixed axis.

In operation, and assuming that the motor and the shaft are at a dead stop, governor parts will be in the position generally indicated in Fig. 3. When the motor starting switch is closed or power is otherwise applied through the governor switch contacts to the motor, the motor will start to rotate, driving the shaft 45. As the shaft rotates, the flyballs move outwardly against the sloping faces 37 of the holder 35 and 39 of the plate 38 until the speed of rotation is sufficient for the centrifugal force of the balls to overcome the adjusted pressure exerted by the spring 42. When this occurs, the flyballs will move the plate member 38 and its attached finger 40 toward expanded position, compressing the spring 42, as shown in Fig. 4. By this arrangement, the governor element will "extend" itself to a degree proportional to the square of the speed of rotation of the motor driven shaft, and at a selected speed it will open the governor switch which was pre-set in a position corresponding to the extent of governor movement permissible for the selected speed. The position of the governor switch with relation to the rotating unit of the governor is set as above described, by rotation of the control knob and its cam to a position corresponding to a desired shaft speed.

The parts are so dimensioned and designed that when a chosen operating speed is reached or exceeded by the shaft, the flyballs will have moved the finger 40 to a position where the finger tip 41 bears against the flexible contact arm 29 and moves the contact 30 away from the contact 28, opening the circuit to the motor. The shaft will then start to slow down, the centrifugal force on the flyballs will be lessened, and the governor compression spring will retract the finger from the switch contact arm, allowing this arm to again close the motor circuit. This re-establishes the motor drive and the governor element will again expand when the calibrated speed is reached, and the circuit opening and closing cycle will be repeated indefinitely for speed governing.

Because no brushes or ring contacts are needed in the control circuit of my invention, the electrical reliability of this governor should be high. Furthermore, because the spring contact arm is relieved of all other loads excepting that of closing the contacts, the wear between this contact arm and the tip of the governor finger is minimized. The compression spring, which is built into the governor element itself, will serve to return the governor element to contracted position when not operating under sufficient centrifugal force. Adjustment of the position of the switch arms for different speeds is not accompanied by any additional force imposed on the switch itself, because the whole switch supporting member is moved.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. A governor of the type adapted to be mounted on the rotational axis of a rotating member to be governed and having a portion expanding along said axis upon rotation of said member, said governor comprising a cup secured to said rotating member at the rotational axis thereof and having an open face symmetrical about said axis, a ball track in said cup, a nut member adjustably threaded within and substantially closing said open face, a central passageway through said nut member, flyballs on said ball track, a ball retainer slidably mounted axially within said cup opposite said track and said flyballs, said flyballs acting between said track and said retainer and tending to move said retainer axially of said cup away from said track upon rotation of said rotating member, a finger on said retainer freely extending through said passageway in said nut member, and means adjustably opposing movement of said retainer by said flyballs, comprising a compression spring in said cup extending between said nut member and said ball retainer, whereby adjustment of said nut will vary the compression of said spring on said retainer.

2. In a governor of the type having an element mounted on the end of a rotating shaft and a portion of said element expanding axially of said shaft upon rotation, that improvement in said element comprising a holder in the form of a cup coaxially secured to said shaft end with an open face facing away from said shaft end, a dished ball-track in said cup, a nut adjustably threaded into said open face of the cup, a central passageway through said nut, a plurality of flyballs on said dished track, a ball retainer with a dished face slidably mounted to move axially within said cup opposite said dished track and said flyballs, said flyballs, upon rotation of said cup, biasing said ball retainer face away from said ball-track, an axial finger on said ball retainer extending outside of said cup through said passageway in said nut and a coiled compression spring wholly within said cup, positioned around said finger and actively extending between said nut and said ball retainer, opposing the bias of said retainer by the action of said flyballs.

JAMES F. YOUNG.

REFERENCES CITED

The following references are of record in the file of this patent:

UNITED STATES PATENTS

| Number | Name | Date |
|---|---|---|
| 1,241,808 | Balough | Oct. 2, 1917 |
| 1,698,322 | Stobe | Jan. 8, 1929 |
| 1,910,245 | Harrelson | May 23, 1933 |
| 2,099,050 | Chamberlain | Nov. 16, 1937 |
| 2,141,772 | Stadler | Dec. 27, 1938 |
| 2,377,830 | Von Reppert | June 5, 1945 |
| 2,466,273 | Price | Apr. 5, 1949 |